Jan. 19, 1965   S. PETERSON   3,166,046
EGG COLLECTION SYSTEM

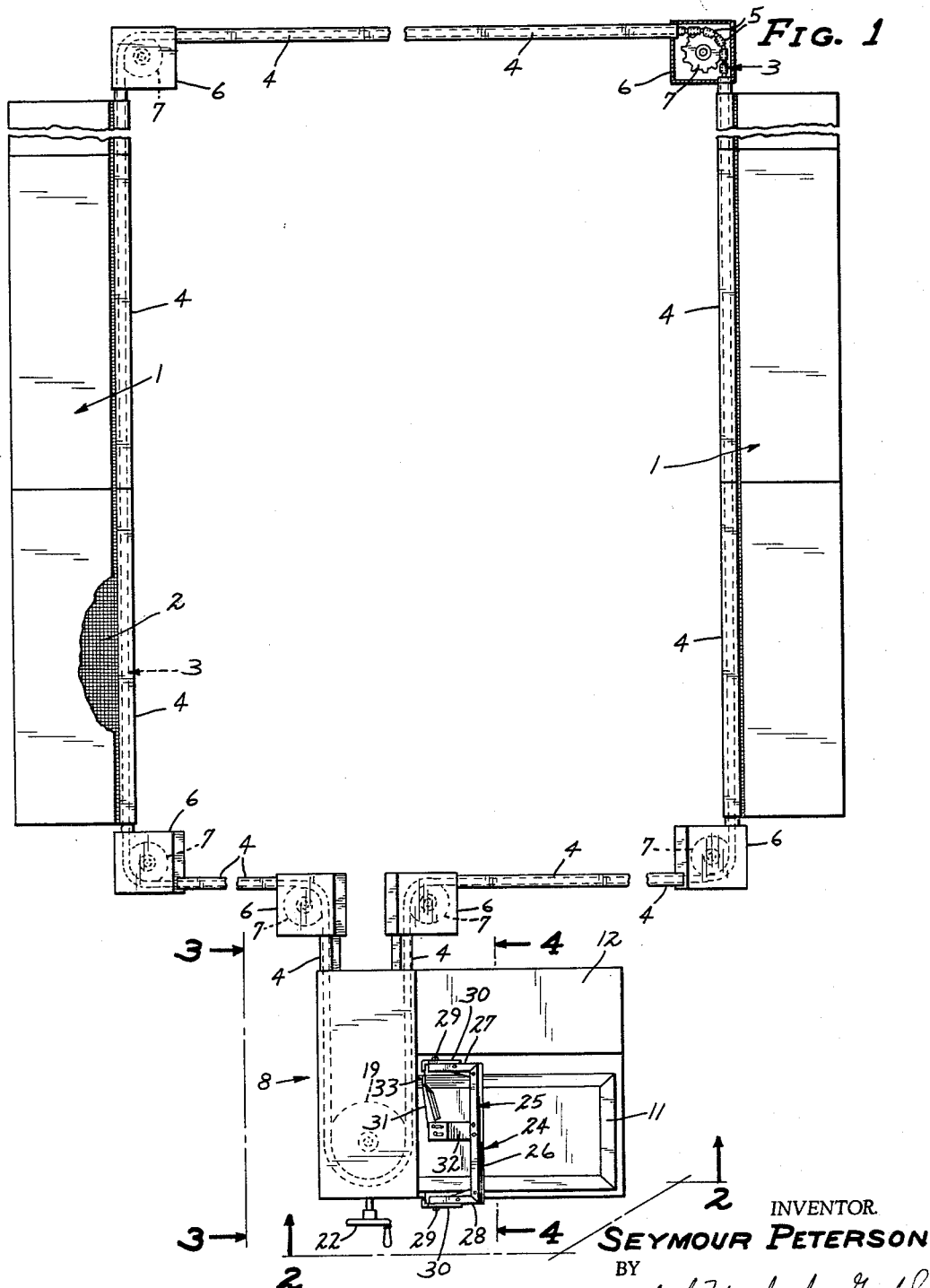

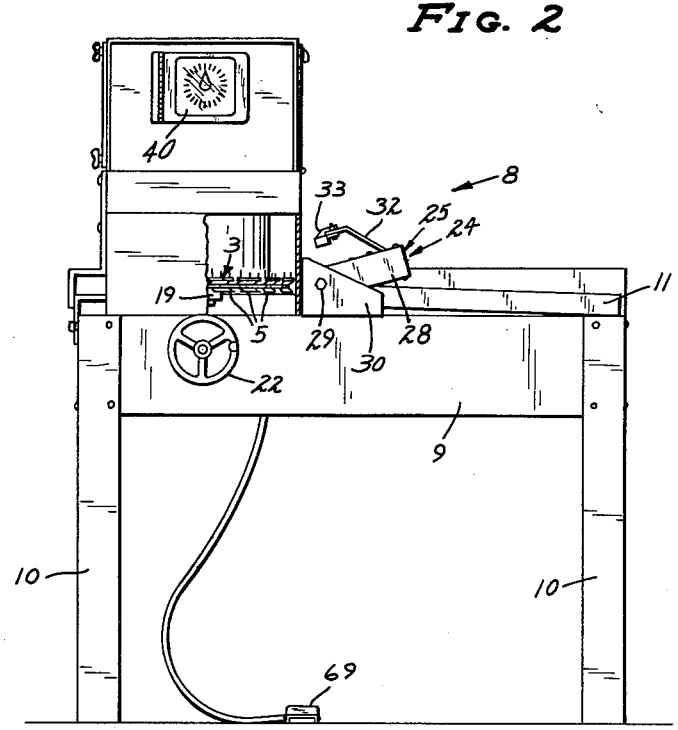
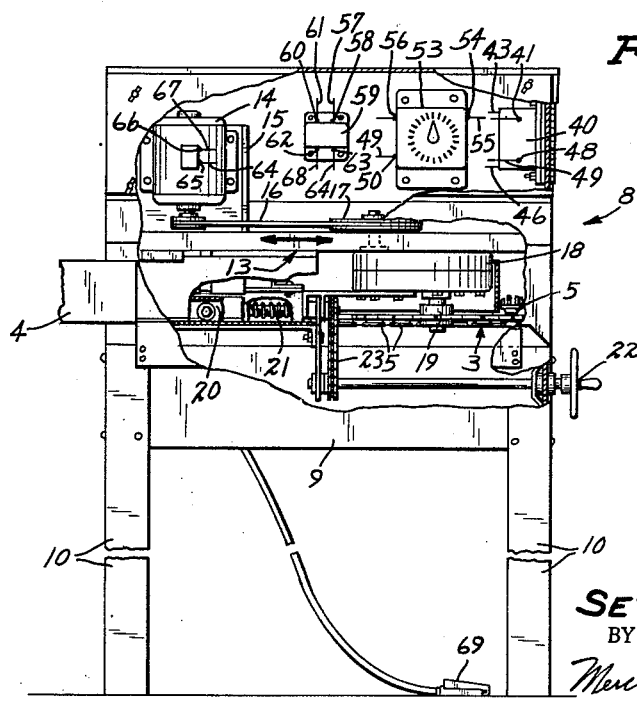

Filed Aug. 9, 1962   3 Sheets-Sheet 3

INVENTOR.
SEYMOUR PETERSON
BY
*Merchant, Merchant & Gould*
ATTORNEYS

United States Patent Office 3,166,046
Patented Jan. 19, 1965

3,166,046
EGG COLLECTION SYSTEM
Seymour Peterson, Dassel, Minn., assignor to Storm Industries, Inc., Dassel, Minn., a corporation of Minnesota
Filed Aug. 9, 1962, Ser. No. 215,825
4 Claims. (Cl. 119—48)

This invention relates generally to automated poultry equipment and machinery, and more particularly it relates to a novel egg collection system having control means adapted to compensate for changes in the egg laying rate.

The several problems for which the present invention provides desirable solutions have at least in part been occasioned by the following considerations. It is desirable to design the usual egg production system with the laying nests positioned in a pattern designed to accommodate the efficient use of a continuous loop collection conveyor, as well as to provide a nest pattern which will attract the fowl into the nests for laying. The continuous conveyor in the usual set-up, in addition to storing or holding the eggs deposited thereon, functions to transport the eggs from the laying nest to a position where they may be diverted for pickup or other processing. With the type of conveyor assembly normally employed with egg production systems of the type disclosed herein, the number of eggs which will be laid in a given one of the nests will usually be several times the number of eggs which may be stored or transported away by the length of conveyor usually exposed to such nest at any given time. Therefore, in order to prevent the breakage of eggs, one reason is presented for the necessity for movement of the conveyor system in order to collect or store the eggs.

Other difficulties leading to the development of the present invention are presented by what is generally termed changes in the egg laying rate. It is usually desirable to position the laying nests in side-by-side relationship about the laying house so as to provide spaced groups of nests, as where the laying nests are positioned in rows along the sides of the laying house with no nests positioned in the spaces at the ends of the house. Coupled with such consideration is the fact that many times the birds select a limited group of the laying nests or even a certain single nest as their favorite laying area, to the exclusion of the remainder of the laying nests. Consequently, eggs accumulate in undesirable numbers in certain areas of the system whereby to result in a high breakage rate if the situation is not alleviated. With this in mind, it will be noted that certain sections of the conveyor assembly will become overburdened with eggs, while those conveyor sections in which the laying is relatively light, along with the conveyor sections not exposed to laying nests, will receive eggs if at all only to a number far below their carrying capacity. Therefore, another reason is presented for the desirability of devising means for controlling the movement of the collection conveyor system in coordination with anticipated changes in the egg laying rate.

Another consideration resides in the well known fact that birds usually lay more heavily at certain periods of the day, so as to present another factor which may effect a change in the egg laying rate. Coupled therewith is the fact that mechanical limitations prevent the installation of single conveyor loops long enough to gather eggs from a sufficient number of birds to keep a collecting operator for the collecting machines working at an efficient rate of collection. As noted, at best it would only be possible to work at capacity during a relatively short period of time corresponding to the time when the birds are laying at a heavy rate. In order to make more efficient use of the operator's time, another reason is presented for the desirability of allowing the collecting conveyor to fill to near capacity before the collection operation is begun.

It is an object of this invention to overcome the above noted difficulties by providing control means in combination with an egg collection system for effecting a change in the movement of the collection conveyor in coordination with anticipated changes in the egg laying rate.

Another object of this invention resides in the provision of control means for use in combination with an egg collection system so as to provide greatly increased efficiency with respect to the collection conveyor equipment and mechanism.

Another object of this invention resides in the provision of control means for use in combination with an egg collection system which is characterized by an extremely low egg breakage rate.

A further object of this invention resides in the provision of control means for an egg collection system which helps to regulate the egg collecting schedule for maximum operating efficiency and egg quality.

Other objects of this invention reside in the provision of control means for an egg collection system which is simple in its construction and installation, and which has proven to be extremely durable throughout long periods of continued use.

The above and still further objects and advantages of this invention will become apparent from a consideration of the following specification, appended claims and attached drawings.

Referring to the drawings, wherein like reference characters indicate like parts or elements throughout the several views thereof:

FIG. 1 is a plan view of an egg collection system according to the present invention, some parts being broken away;

FIG. 2 is an enlarged view in elevation taken generally on the line 2—2 of FIG. 1, some parts being broken away;

FIG. 3 is an enlarged view in elevation taken substantially on the line 3—3 of FIG. 1, some parts being broken away;

Figure 4:
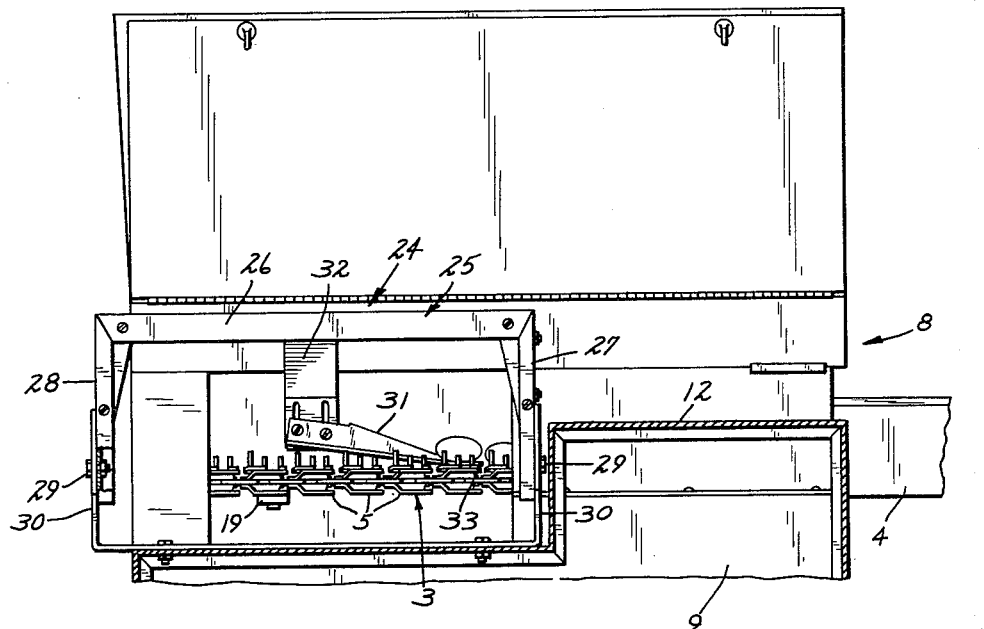
FIG. 4 is an enlarged view in section taken generally on the line 4—4 of FIG. 1, with some portions thereof shown in an alternative position, and with some parts broken away.

Referring in greater detail to the drawings, and particularly FIG. 1 thereof, the novel egg collection system disclosed herein includes a plurality of nesting enclosures, designated generally by the reference numeral 1, and arranged in generally side-by-side relationship about the laying area and further arranged in spaced groups of nests, as shown particularly in the drawings. The nesting enclosures are open adjacent one side portion thereof and define laterally opening egg discharge chutes 2. The egg collection system further comprises a movable endless loop collection conveyor, represented generally by the reference numeral 3. The collection conveyor 3 is adapted to ride on a guide track defined by the bottom wall of a generally cross-sectionally rectangular generally tubular conveyor enclosure 4. The conveyor enclosure 4 is designed to shield the collection conveyor 3 and protect the same from the roosting of birds, and the conveyor enclosure 4 is provided with lateral openings adjacent the laying nests 1 for permitting the passage of the eggs onto the collection conveyor 3 from the discharge chutes of the nests 1.

The endless loop collection conveyor 3 may be of any suitable type providing satisfactory egg collection performance, and is shown particularly in FIGS. 2 and 3 as including a pluraltiy of link elements 5 each one of which is fitted with a suitable egg receiving tray. The collecting conveyor 3 is provided for moving the eggs from the laying nests 1 to a position generally remote from the nests, and is further provided with portions disposed adjacent the groups of laying nests 1 and other portions disposed in the spaces between the groups of nests 1. As shown particularly in FIG. 1, a plurality of box-like corner conveyor housings 6 are provided at all points whereat the collection conveyor 3 changes direction. The corner conveyor housings 6 each carry an idle sprocket 7 for defining the path of travel of the collection conveyor 3 and also for imparting the requisite amount of tension thereto.

After the eggs have been deposited from the laying nests 1 onto the collection conveyor 3, they are then transported by the conveyor 3 to a diverting and collecting table, represented generally by the reference numeral 8. The collecting table 8 comprises a generally horizontal frame structure 9 having depending corner legs 10 for supporting the table 8 in a generally upright condition on the floor, as shown particularly in FIGS. 2 and 3. The collecting table 8 defines an upwardly exposed padded collecting pan 11 onto which the eggs are delivered, in a manner which will be described hereinafter, for manual pick-up or further processing. The collecting table 8 also defines an upwardly disposed work surface 12 adjacent the collecting pan 11 provided for the storage of packaging flats or other desired uses. The collecting table 8 further comprises a sliding carriage unit, represented generally by the reference numeral 13, mounted for generally horizontal sliding movements in the direction represented generally by opposed arrows in FIG. 3. The sliding carriage unit 13 carries the driving mechanism for the collection conveyor 3, and although the specific driving means illustrated is obviously not an important feature of this invention, the same comprises a drive motor 14 mounted by a suitable mounting bracket 15 and having its pulley connected by an endless belt 16 to the enlarged pulley 17 of a reduction unit 18. The output side of the reduction unit 18 includes a relatively large sprocket wheel 19 adapted to drive the collection conveyor 3 by inserting its circumferentially spaced teeth into openings defined by the link elements 5 of the conveyor 3. The drive mechanism for the conveyor 3 is illustrated particularly in FIG. 3 of the drawings.

Tension adjustment means for the conveyor 3 is provided, and the same comprises means for imparting sliding movement to the carriage unit 13 with respect to the opposed guide tracks 20 upon which the carriage unit 13 is mounted. The tension adjustment means comprises a screw rod 21 rotatably mounted within suitable bracket means secured to the table frame structure 9 and threadingly received within a traveler collar, not shown, provided on the carriage unit 13. A suitable crank 22 is rotatably mounted on the frame structure 9 and connected by means of a drive belt or chain 23 to an end portion of the screw rod 21 whereby to impart the above noted sliding movements to the carriage unit 13 upon rotation of the crank 22, as illustrated particularly in FIG. 3.

The diverting and collecting table 8 further comprises diverting mechanism, represented generally by the reference numeral 24, the same being adapted to divert or remove the eggs from the collection conveyor 3 onto the padded collecting pan 11. The diverting mechanism 24 comprises a generally inverted U-shaped bridge bar 25 having a generally horizontal intermediate portion 26 and generally depending side portions 27, 28. The bridge bar 25 is mounted for pivotal movements about a generally horizontal axis by means of pivot pins 29 received within a pair of upstanding mounting brackets 30 secured to the table frame structure 9, as shown particularly in FIGS. 2 and 4. The diverting mechanism 24 further comprises a diverting arm, 31 adjustably mounted on a depending bracket 32 secured to the intermediate portion 26 of the bridge bar 25. The diverting arm 31 defines a tongue 33 at one of its end portions adapted to slip under the eggs carried by the moving collection conveyor 3 and roll the eggs off onto the collecting pan 11 when the diverting mechanism 24 is in its operative position shown particularly in FIG. 4. As noted, the diverting mechanism 24 is mounted for pivotal movements to a non-diverting or inoperative position, shown particularly in FIGS. 1 and 2.

As noted in the foregoing introduction hereto, an egg collection system is often characterized by changes in the egg laying rate, such rate changes being often caused by varying and different circumstances. One cause for the change in the egg laying rate is often due to the preference of some of the birds for specific and selected laying nests to the exclusion of the other nests whereby the egg collecting conveyor would receive an overload of eggs at various points of the system and an underload of eggs at other points thereof. Another reason for a change in the egg laying rate with respect to relative time intervals is due to the fact that the birds usually lay heavier during certain rather definite time periods during the day. Another circumstance which must often be considered results from the layout of the egg collection system within the laying house so as to provide groups of the laying nests 1 in side-by-side relationship with respect to one another and also provide spaces along the collection conveyor 3 where there are no nests, such as at the ends of the laying house. All of the above circumstances, as well as others not mentioned, are referred to herein by use of the terminology "changes in the egg laying rate." In order to overcome the problems presented by such changes in the egg laying rate, the present invention provides control means for use in combination with an egg collection system to compensate for such rate changes.

Pre-set control means for controlling the movement of the collection conveyor 3 in coordination with changes in the egg laying rate may be suitably provided in several ways. One way is to provide an intermittent movement of the collection conveyor 3 during periods of heavy laying or at various positions of heavy laying so as to expose non-filled portions of the extended conveyor 3 to the various positions of heavy laying. Another way is to provide for a continuous movement of the collection conveyor at a rate differing from the rate of normal movement thereof during the periods of egg laying activity so as to expose the extended length of the conveyor to various positions of heavy laying in the system. Such other ways to provide for a continuous movement of the collection conveyor at different rates of speed may be carried out by the use of any well-known type of variable speed motor but for purposes only of illustration, pre-set control means will be described of the type providing for an intermittent movement of the collection conveyor 3 during periods of or at positions of heavy laying activity. The illustrated embodiment of such pre-set control means generally comprises a timer adapted to be pre-set to correspond with the anticipated changes in the egg laying rate, and also actuating means connected with the timer and disposed so as to effect an intermittent change in the movement of the collection conveyor 3. Such illustrated control means is easily understandable by reference to the circuits diagram of FIG. 5, wherein it will be noted that switch means of the type actuated by a change in the position of the entire switch, such as a mercury switch, is provided. More particularly, a pair of mercury switches 34, 35 are arranged in the particular relative positions shown in FIG. 5. The switch 34 has one of its terminals 36 connected in common with a terminal 37 of the switch 35, and both of the terminals 36, 37 are connected by means of a lead wire 38 to a source of permanent electric power, such as the 120-volt line 39.

A primary timer 40 has one of its terminals 41 connected to the 120-volt line 39 and its other terminal 42 connected to a neutral or ground wire 43, whereby the primary timer 40 will be operative at all times. The primary timer 40 is set to go on and off at specified times of the day, which times generally correspond to the beginning and end of heavy egg laying periods. The pre-set control means noted above also generally comprises actuating means, specifically including the motor 14 and its related driving apparatus, connected with the primary timer 40 and disposed so as to effect a change in the movement of the collection conveyor 3. The primary timer 40 is operatively connected to the switch 44 so as to move the switch 44 to a conducting or closed condition at the beginning of the designated period, and also to move the switch 44 to an open or non-conducting condition at the end of the designated period. The switch 44 has one of its terminals 45 connected by means of a lead wire 46 to the other end terminal 47 of the mercury switch 34. The other terminal 48 of the switch 44 is connected by means of a lead wire 49 to one terminal 50 of a second switch 51. The terminal 50 of the switch 51 is connected in common with one terminal 52 of a secondary timer 53, the other terminal 54 of which is connected by means of a lead wire 55 to the ground line 43, whereby to energize the secondary timer 53 whenever the switch 44 is moved to its closed or conducting position by the primary timer 40. The secondary timer 53 is set to open and close the switch 51 at intermittent intervals, as for example every 5 minutes. Since the other terminal 56 of the switch 51 is connected by means of a lead wire 57 to one terminal 58 of a relay coil 59, the other terminal 60 of which is connected by a lead wire 61 to the ground wire 43, whenever the switch 51 is moved to its closed position by the timer 53, the movable relay contact 62 will be drawn into engagement with the relay contact 63 so as to supply power to the drive motor 14. To such end, the relay contact 63 is connected by means of a lead wire 64 to one terminal 65 of the motor 14, and the other terminal 66 of the motor 14 is connected by means of a lead wire 67 to the ground wire 43. Also, the movable relay contact 62 is connected by means of a lead wire 68 to the 120-volt line 39.

For the purpose of providing manual control means for stopping and starting the collection conveyor 3 when the diverting mechanism 24 is in its upper operative position so that the egg diverting rate may be regulated to correspond to the operator's own ability to further handle or process the same, a foot switch 69 is interposed in the relay circuit for the drive motor 14. The foot switch 69 is connected by means of a lead wire 70 to the other terminal 71 of the mercury switch 35, and also connected by means of a lead wire 72 to an intermediate tap 73 in the lead wire 57 connecting the secondary timer switch 51 with the relay coil 59.

From a consideration of the pre-set control means described above for controlling the movement of the collection conveyor 3 so as to compensate for the anticipated changes in the egg laying rate, it will be obvious that said pre-set control means is only operative in controlling the movement of the collection conveyor 3 when the diverting mechanism 24 is in its lower inoperative position shown in FIGS. 1 and 2, and wherein the mercury switch 35 will be in an open condition so as to remove current from the foot switch 69 and the mercury switch 34 will be in a closed conducting condition so as to supply current to the primary timer switch 44. Then, when the primary timer switch 44 is caused to close by actuation from the primary timer 40, current will then be supplied to the secondary or cycle timer 53, which will then run and close and open the switch 51 intermittently, such as for example every 5 minutes. When the secondary or cycle timer 53 closes the secondary switch 51, current is directed to the relay coil 59 so as to close the relay contacts 62, 63 and supply current to the drive motor 14. The drive motor 14 will then run at intermittent intervals so as to move the collection conveyor 3 for certain precalculated distances and thereby alleviate the otherwise overburdened supply of eggs to the collection conveyor 3 by the above noted changes in the egg laying rate.

Figure 5:
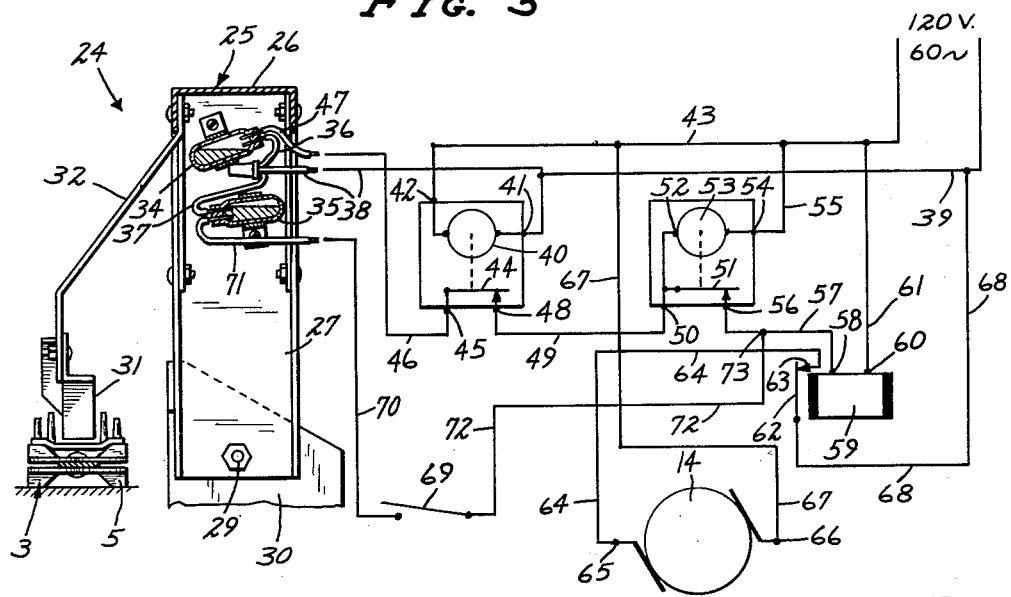
FIG. 5 is a circuit diagram for a portion of this invention.

When the diverting mechanism 24 is in its upper or diverting condition shown particularly in FIGS. 4 and 5, the pre-set control means for intermittently changing the movement of the collection conveyor 3 will become inoperative since the open condition of the mercury switch 34 removes current from the primary timer switch 44. However, since the mercury switch 35 will be in a closed condition, current will be carried directly to the foot switch 69, which when manually closed will supply current to the relay coil 59 and thereby energize the drive motor 14. It is noted that it is preferable to get at least one complete revolution of the collection conveyor 3 between the diverting or pick-up periods of the diverting mechanism 24 so as to more evenly distribute the eggs onto the collection conveyor 3.

This invention has been thoroughly tested and found to be completely satisfactory for the accomplishment of the above objects; and while I have shown and described above a preferred embodiment thereof in which the principles of the present invention have been incorporated, I wish it to be specifically understood that the same may be modified without departure from the scope and spirit of the appended claims.

What I claim is:

1. In an egg collection system for use wherein the egg laying rate may change due to a variance in the relative laying rate at certain locations of the system as compared with other locations thereof or due to a fluctuation in the total laying rate between relatively heavy laying time periods and relatively light laying periods:
    (a) a plurality of laying nests arranged in generally side-by-side relationship about the laying area and further arranged in spaced groups of nests,
    (b) a movable endless loop collection conveyor for moving the eggs from the nests to a position generally remote from the nests and having portions disposed adjacent the groups of nests and other portions disposed in the spaces between the groups of nests, and
    (c) control means for imparting movement to said movable collection conveyor in response to anticipated changes in the laying rate, said control means including:
        (1) a timer adapted to be pre-set to correspond with the anticipated changes in said laying rate, and
        (2) timer actuated means connecting with said timer and disposed so as to effect a change in the movement of said collection conveyor whereby to position the portions of the conveyor previously disposed adjacent the spaces between the nests to a position adjacent the nests.

2. In an egg collection system for use wherein the egg laying rate may change due to a variance in the relative laying rate at certain locations of the system as compared with other locations thereof or due to a fluctuation in the total laying rate between relatively heavy laying time periods and relatively light laying periods:
    (a) a plurality of laying nests arranged in generally side-by-side relationship about the laying area,
    (b) a movable endless loop collection conveyor for moving the eggs from the nests to a position generally remote from the nests, said movable collection conveyor being adapted for movements at varying rates of speed and the same moving at a relatively low rate during the light laying period, and
    (c) control means for imparting movement to said movable collection conveyor in response to anticipated changes in the laying rate, said control means including:

(1) a timer adapted to be pre-set to correspond with the anticipated changes in said laying rate, and
(2) timer actuated means connected with said timer and disposed so as to effect an intermittent change in the rate of conveyor movement from said relatively low rate to a relatively high rate of speed.

3. In an egg collection system for use wherein the egg laying rate may change due to a variance in the relative laying rate at certain locations of the system as compared with other locations thereof or due to a fluctuation in the total laying rate between relatively heavy laying time periods and relatively light laying periods:
 (a) a plurality of laying nests arranged in generally side-by-side relationship about the laying area,
 (b) a movable endless loop collection conveyor for moving the eggs from the nests to a position generally remote from the nests, said movable collection conveyor being adapted for movements at varying rates of speed and the same moving at a relatively low rate during the light laying period,
 (c) control means for imparting movement to said movable collection conveyor in response to anticipated changes in the laying rate, said control means including:
  (1) a primary timer adapted to be pre-set for movement between an on position and an off position respectively corresponding to the beginning and end of anticipated changes in the egg laying rate,
  (2) a secondary timer energized by said primary timer when the same moves to its on position and de-energized by said primary timer when the same moves to its off position, said secondary timer being pre-set to cycle between intermittent on and off positions, and
  (3) actuating means connected with the secondary timer and disposed so as to effect an intermittent change in the rate of conveyor movement from said relatively low rate to a relatively high rate of speed when the secondary timer is energized by said primary timer.

4. In an egg collection system for use wherein the egg laying rate may change due to a variance in the relative laying rate at certain locations of the system as compared with other locations thereof or due to a fluctuation in the total laying rate between relatively heavy laying time periods and relatively light laying periods:
 (a) a plurality of laying nests arranged in generally side-by-side relationship about the laying area,
 (b) a movable endless loop collection conveyor for moving the eggs from the nests to a position generally remote from the nests,
 (c) a movable diverter positioned adjacent said collection conveyor at said remote position thereof, said diverter being mounted for movement between a diverting position for removal of eggs from said collection conveyor and a non-diverting position,
 (d) pre-set control means for imparting movement to said movable collection conveyor in response to anticipated changes in the laying rate, and
 (e) said pre-set control means including a switch carried by said movable diverter and actuated by changes in the position of said diverter, whereby when said diverter is in its diverting position, said switch interrupts or de-energizes said control means, and when said diverter is in its non-diverting position, said switch permits operation of said control means.

References Cited by the Examiner
UNITED STATES PATENTS

| | | | |
|---|---|---|---|
| 2,710,682 | 6/55 | Coll | 119—48 |
| 2,745,379 | 5/56 | Schmidt | 119—48 |
| 2,973,742 | 3/61 | Kaegebein | 119—48 |
| 2,987,038 | 6/61 | Cole | 119—48 |

SAMUEL KOREN, *Primary Examiner.*

CARL W. ROBINSON, HUGH R. CHAMBLEE,
*Examiners.*